(12) United States Patent
Chen

(10) Patent No.: US 6,731,842 B2
(45) Date of Patent: May 4, 2004

(54) MICROBEND FUSED FIBER COUPLER METHOD AND APPARATUS

(75) Inventor: Peter Z. Chen, Santa Clara, CA (US)

(73) Assignee: Finisar Corporation, Sunnyvale, CA (US)

(*) Notice: Subject to any disclaimer, the term of this patent is extended or adjusted under 35 U.S.C. 154(b) by 0 days.

(21) Appl. No.: 10/345,770

(22) Filed: Jan. 16, 2003

(65) Prior Publication Data

US 2003/0138212 A1 Jul. 24, 2003

Related U.S. Application Data

(63) Continuation of application No. 09/471,583, filed on Dec. 22, 1999, now Pat. No. 6,560,388.

(51) Int. Cl.⁷ ................................................ G02B 6/26
(52) U.S. Cl. ........................... 385/43; 385/32; 385/45; 385/48; 385/31
(58) Field of Search ...................... 385/43, 42, 45–47, 385/31, 32, 39

(56) References Cited

U.S. PATENT DOCUMENTS

| | | | |
|---|---|---|---|
| 4,763,977 A | 8/1988 | Kawasaki et al. | |
| 4,842,359 A | * 6/1989 | Imoto et al. | 385/46 |
| 5,138,676 A | * 8/1992 | Stowe et al. | 385/32 |
| 5,146,519 A | 9/1992 | Miller et al. | |
| 5,339,374 A | 8/1994 | Murphy et al. | |
| 5,452,393 A | 9/1995 | Stowe et al. | |
| 5,809,190 A | 9/1998 | Chen | |
| 6,081,641 A | 6/2000 | Chen | |
| 6,236,782 B1 | 5/2001 | Kewitsch | |
| 6,363,190 B1 | 3/2002 | Chen | |
| 6,411,323 B1 | 6/2002 | Waarts | |

FOREIGN PATENT DOCUMENTS

| | | |
|---|---|---|
| EP | 60217312 | 10/1985 |
| EP | 60217313 | 10/1985 |
| EP | 0 390 002 A2 | 3/1990 |
| FR | 2 507 787 | 12/1982 |

\* cited by examiner

*Primary Examiner*—Drew Dunn
*Assistant Examiner*—Fayez Assaf
(74) *Attorney, Agent, or Firm*—Workman Nydegger

(57) ABSTRACT

Disclosed is a microbend fiber optic coupler and a method of forming same. The microbend fiber optic coupler includes two pairs of pigtail ends oriented one beside the other and having a bent fused biconically tapered coupling region interposed therebetween.

20 Claims, 7 Drawing Sheets

MICROBEND FUSED FIBER COUPLER METHOD AND APPARATUS

This is a continuation of application Ser. No. 09/471,583, now U.S. Pat. No. 6,560,388B1, filed on Dec. 22, 1999.

BACKGROUND OF THE INVENTION

1. Field of the Invention

This invention relates to fiber couplers. More particularly, this invention relates to fused fiber couplers and methods especially relating to fused fiber couplers having a coupling region including a bend.

2. The Prior Art

With the increase in throughput required for today's communications technology has come the need for better, faster, smaller, less costly, fiber optic devices due to fiber optics advantages over various other media. Because of these needs, the advantage of fused fiber couplers has become increasingly evident.

More recently, the fused biconical taper technique for forming fiber optical couplers including Wavelength Division Multiplexers (WDM) has proven advantageous as well, as described and applied in U.S. Pat. No. 5,809,190 in a Dense Wavelength-Division Multiplexer (DWDM) application. Though advantageous, the technology described in U.S. Pat. No. 5,809,190 is burdened by size constraints. That is, fused Wavelength Division Multiplexers having a pair of pigtail ends on opposed sides of the WDM is a geometric problem in need of a solution. Having to cope with the geometry of such WDMs limits the spatial utility of such devices especially when one attempts to implement them in a WDM tree arrangement.

Furthermore, miniature single fiber bend devices have proven useful in allowing tighter bends to be accomplished as described in U.S. Pat. No. 5,452,393. However, such single fiber techniques have very limited utility.

Therefore, it is an object of the present invention to overcome the shortcomings of the prior art by providing a fiber optical coupler capable of achieving tight bends in the coupling region and thereby, changing the direction of the light path in the coupling region and the layout of the pigtail ends to a single side of the coupler. Disclosed herein, then, is an inventive microbend fused coupler.

BRIEF DESCRIPTION OF THE INVENTION

To overcome these and other shortcomings of the prior art, disclosed herein is a fused fiber optical coupler including a bend in the coupling region. By utilizing a fused biconical taper technique to form the coupling region and thereafter bending the fibers in the region of reduced diameter, a microbend coupler may be achieved resulting in not only a tension-free coupling region, but also a fused fiber coupler of shortened length including pigtail ends all emanating from one side of the fused fiber coupler. Such fused fiber couplers are more stable, smaller, and more flexible for optical applications.

More particularly, a Microbend Fused-Biconical Tapered (FBT) fiber coupler is disclosed. The fused bend area is comprised of a pair of optical fibers heated, twisted and fused together in a coupling region. The fibers include cladding covered cores. In the coupling region, a uniform biconical taper is present, converging from the two ends of the coupling region to a middle section having a reduced diameter as compared to the starting fiber core diameter. The taper angles at each respective end of the coupling region are complimentary. A bend of a minimized radius of curvature is created about a center point of the lesser diameter coupling region. The result is a 2×2 or 1×2 fused fiber coupler having two branch channels which may occupy a lesser spatial area than conventional non-bent couplers. Because the birefringence of the coupler resulting from the progressive stretching is subsequently nulled-out by twisting of the coupling region, the resulting fused fiber coupler includes very low polarization dependence.

The method of forming the microbent fused fiber coupler includes providing two fibers having been stripped of their plastic coatings at a midsection. The two fibers are arranged in parallel and the stripped portions where the plastic coating layer is removed are oriented next to each other. Once the fibers are held in side by side orientation by holding devices, the holding devices pull the fibers axially and force the substantially bare midsections toward one another, preferably by twisting the fibers about one another one time. The two fibers are, thus, in contact with each other and are heated using a gas burner or electric heater. Thereafter, the exposed fiber sections are softened causing their claddings to fuse. Pulling on the softened fibers forms a biconical taper at each of the four ports, a desirable mode interference occurs, and resulting desirable characteristics of fused fiber couplings are present. By then rotating the holding device approximately 180°, and then adhering both ends of the fused region to a substrate, a substantially U-shaped bend in the fused coupling region is formed. The substrate with the adhered microbent fused fiber coupler is then encapsulated within an appropriate confinement.

It is therefore an object of the present invention to provide a 2×2 microbend fused fiber coupler wherein the transmission direction of output light is in a direction opposed to the transmission direction of the input light.

It is another object of the present invention to provide a microbend fused fiber WDM with an environmentally stable passband.

It is yet another object of the present invention to provide a least radius of curvature bend FBT coupler.

It is another object of the present invention to provide a method for forming a microbend FBT coupler.

It is yet another object of the present invention to provide a microbend FBT coupler with very high uniformity of insertion loss of multipassband as a coupler.

Viewed from a first vantage point a fiber optic coupler is disclosed, comprising, in combination: a first fiber; a second fiber; and wherein said first fiber and said second fiber are fused together in a bend region.

Viewed from a second vantage point a fiber optic light routing device is disclosed, comprising, in combination: a pair of light path inlets; a pair of light path outlets; and a bent multiplexing light path oriented between said light path inlets and said light path outlets, said bent multiplexing light path comprising the union of said light path inlets and outlets.

Viewed from a third vantage point a method of forming a fiber optic coupler is disclosed, the steps comprising, in combination: orienting substantially exposed regions of optical fibers side by side; heating and stretching the substantially exposed regions; and bending the exposed region.

Viewed from a fourth vantage point a Wavelength Division Multiplexer is disclosed, comprising in combination: a first pair of fiber pigtails transitioning into a first Y-shaped jumper; a second pair of fiber pigtails transitioning into a second Y-shaped jumper; and a biconically tapered fused bend region interposed between said first Y-shaped jumper and said second Y-shaped jumper.

Viewed from a fifth vantage point a method of forming a microbend Wavelength Division Multiplexer is disclosed, comprising the steps of: providing a plurality of lengths of low loss optical fibers; removing the plastic coating of the fibers at a midsection of the fibers; arranging the skinned fiber midsections in a side by side contact area; heating and stretching longitudinally in a portion of said contact area to form a coupling region; terminating the heating and stretching step once a predetermined passband spacing is obtained; twisting and reheating said coupling region until maximum isolation and minimum insertion loss are obtained; bonding the fused fiber at one end outside of the coupling area to a substrate; rotating the substrate to form a bend in the coupling area; bonding the fused fiber at the other end outside of the coupling area to the substrate; annealing the bend area; trimming the passband spacing and wavelength; and encapsulating the bonded fused fibers and substrate combination within a confine.

BRIEF DESCRIPTION OF THE DRAWING FIGURES

DETAILED DESCRIPTION OF A PREFERRED EMBODIMENT

Figure 1:
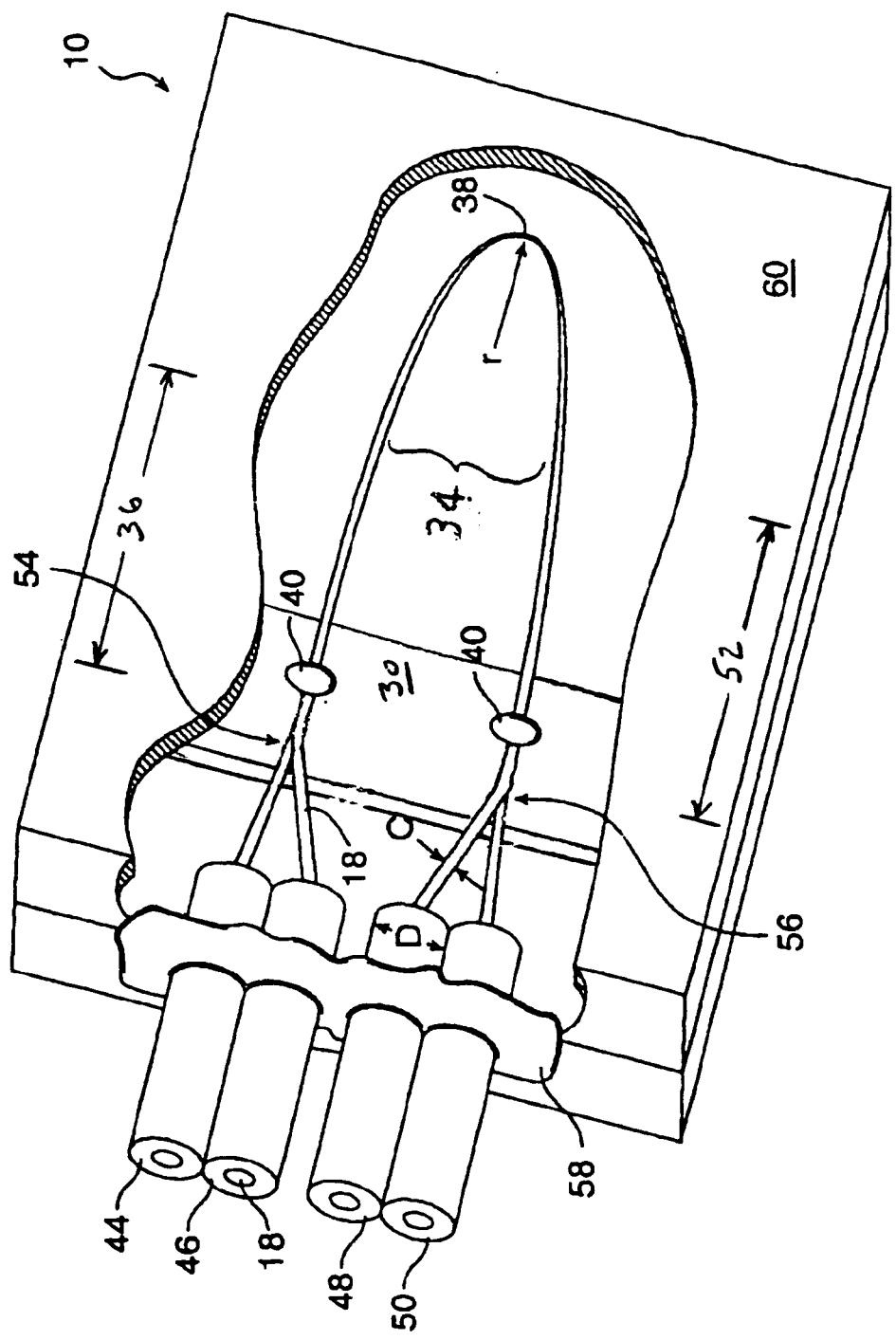
FIG. 1 is a perspective cutaway view of the encapsulated microbend fused fiber coupler of the present invention.

Persons of ordinary skill in the art will realize that the following description of the present invention is illustrative only and not in any way limiting. Other embodiments of the invention will readily suggest themselves to such skilled persons having the benefit of this disclosure.

Considering the drawings wherein like reference numerals denote like parts throughout the various drawing figures, reference numeral 10 is directed to the apparatus according to the present invention. The microbend coupler 10 includes, generally, Y-junctured fiber sections 54 and 56, and coupling region 34.

Figure 2:
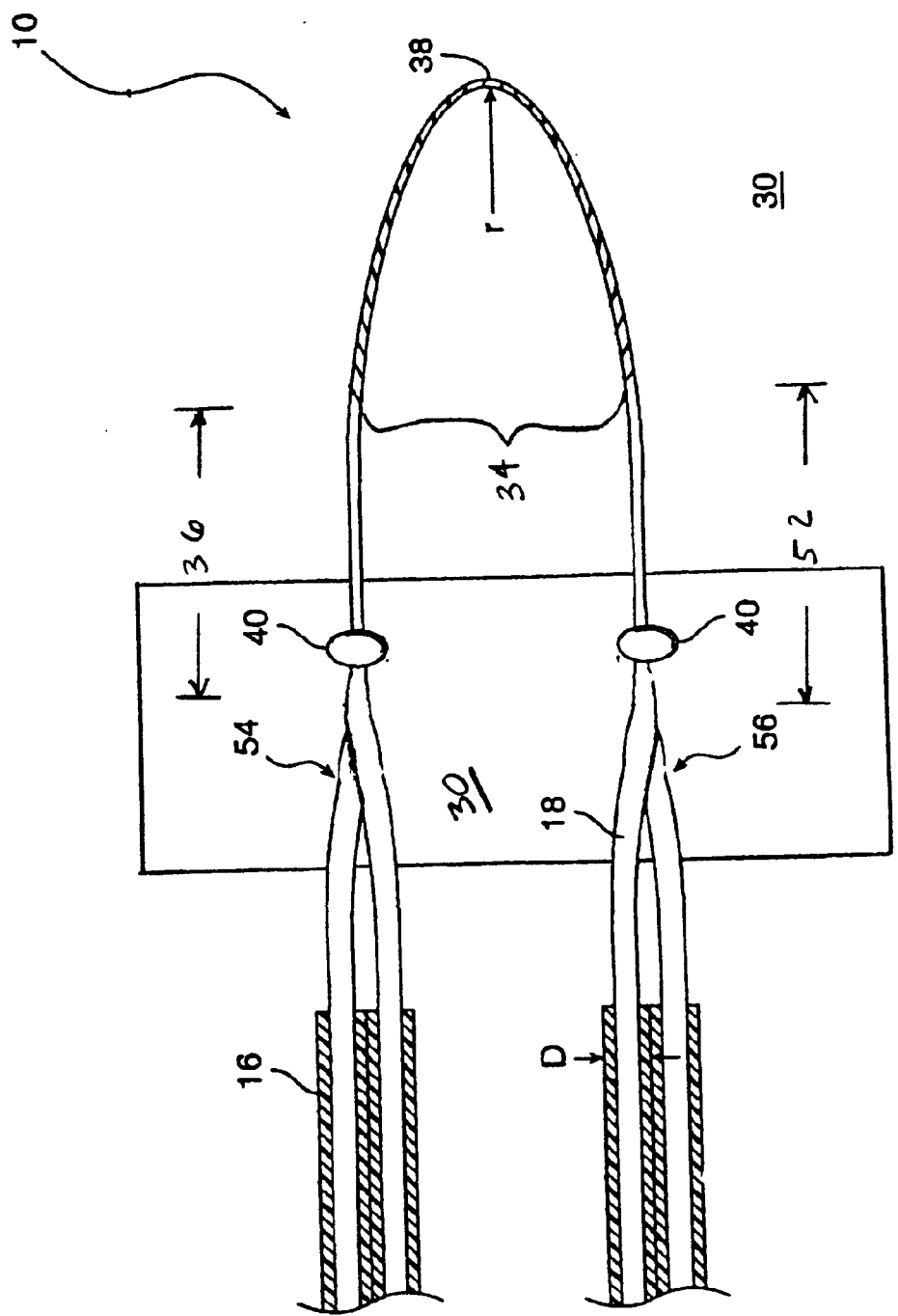
FIG. 2 is a schematic diagram of the inventive microbend fused fiber coupler adhered to a substrate.

More particularly, and referring now to FIGS. 1 and 2, Y-junctured fiber section 54 includes pigtail ends 44 and 46 and non-coupled taper region 36, and Y-junctured fiber section 56 includes pigtail ends 48 and 50 and non-coupled taper region 52. Opposite ends 44 and 46, the Y-juncture 54 transitions from the non-coupled taper region 36 into a coupling region 34. Likewise, opposite ends 48 and 50, the Y-juncture 56 transitions from the non-coupled taper region 52 into the coupled region 34.

The cross-section of the fibers at ends 44, 46, 48, and 50 may be of a variety of geometrically available shapes, but are preferably circular. As is known, optical fibers include a fiber core, cladding enshrouding the core, and a plastic coating. Plastic coating 16 enshrouds the fibers from the ends 44, 46, 48, and 50 up to, but not including, tapered regions 36 and 52. The fiber core 18 is of a standard dimension C, preferably, 9 $\mu$m (micrometer) in diameter (and 125 $\mu$m with cladding). Likewise, the fibers with plastic coating are of a standard dimension D, preferably 250 $\mu$m in diameter.

Thereafter, the coupling region 34 transitions into a portion of non-coupled conically tapered regions 36 and 52, and includes a reduced diameter U-shaped bend 38 in the middle portion of the coupled taper region 34. The conical taper is preferably less than 10° and preferably 5°, and most preferably 0.5° to 2°. The reduced diameter U-shaped bend 38 is generally less than about 80 $\mu$m and is preferably about 5 $\mu$m to about 20 $\mu$m in general diameter. The radius of curvature r within the U-shaped bend is preferably less than 40 mm. More preferably, r is less than 20 mm. Most preferably, r lies in a range of about 5 $\mu$m to 5 mm depending on the application at (narrowband to wideband). It should be noted that r may be varied as necessary and could actually lie in greater diameter ranges, but such ranges would probably not be as interesting. Of course, these radii of curvature are dependent on the diameter of the middle section of the coupled region 38 existing in an essentially air-cladded condition and in a state where mode coupling is achieved. The U-shaped bend 38 exists, then, in an essentially air-cladding condition where the difference of refractive index between the exposed fiber fused core 38 and the air-cladding is in a range of about 0.4 to about 0.6, and preferably is about 0.5. Thus, the radius of curvature r is dependent on how much the fibers are stretched and reduced in diameter. For example, but not intended by way of limitation, the exposed coupling region depends on the torch diameter and the coupling ratio of the coupler or wavelength spacing of the WDM, and may initially be 5–15 mm, and be pulled 10–20 mm resulting in a 10–20 mm in length reduced diameter region 38. Further, for a WDM, r also depends on resultant wavelength characteristics desired. The U-shaped bend may actually be of any bending arc; that is, where the bend formed is more than 0° relative to the fused fibers as originally positioned prior to bending. The arc is preferably greater than 90° and most preferably approximately 180°.

The microbend coupler 10 is bonded to substrate 30 with an appropriate bonding material 40, such as UV cured or thermal cured epoxy. The bonding area is in non-coupling regions 36 and 52. The substrate 30 may be any environmentally stable material such as metal, ceramic, or glass. The microbend coupler 10 adhered to substrate 30 is preferably encapsulated within a preferably hermetically sealed confine 60. The microbend coupler is encapsulated within the container 60 with an appropriate thixotropic paste 58 such as EPO-TEK 353 ND Epoxy or other similar means such as soldering or laser welding. Each pigtail pair of ends will be held substantially side by side and the two pair of pigtail ends then will be preferably held within 5 mm of each other, but may lie in any desired range such as 250 $\mu$m to 10 mm. The encapsulated microbend coupler 10 may then be coupled to other appropriate fiber optic devices as will be appreciated by those skilled in the art.

Having now described the microbend coupler, an optional application as a Microbend Fused Biconical Tapered coupler, its use and operation as a 1×2 or 2×2 multiplexer will be appreciated by those skilled in the art informed by this disclosure.

Figure 3:
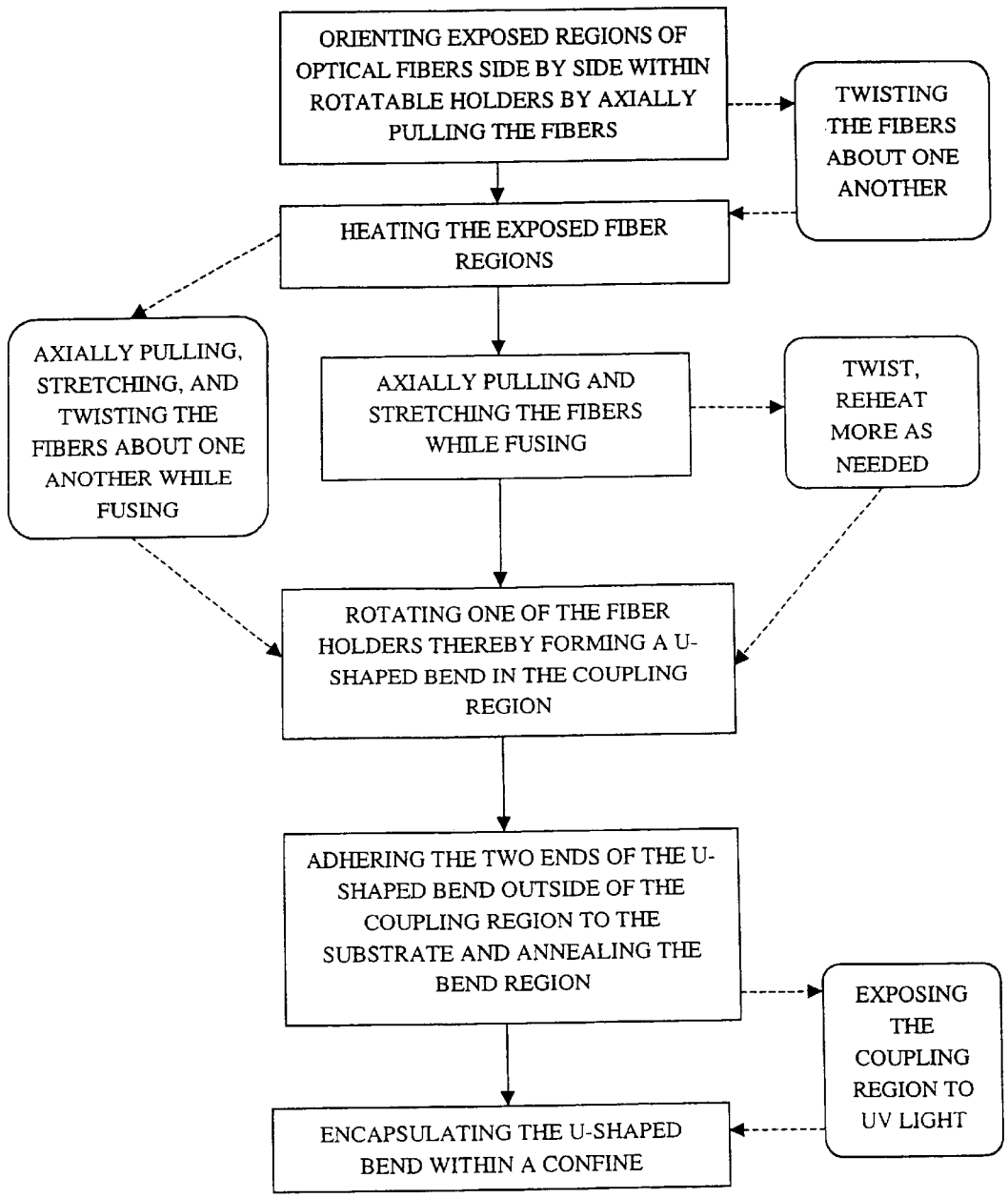
FIG. 3 is a flowchart of the method of making a microbend fused fiber coupler.
Figure 4:
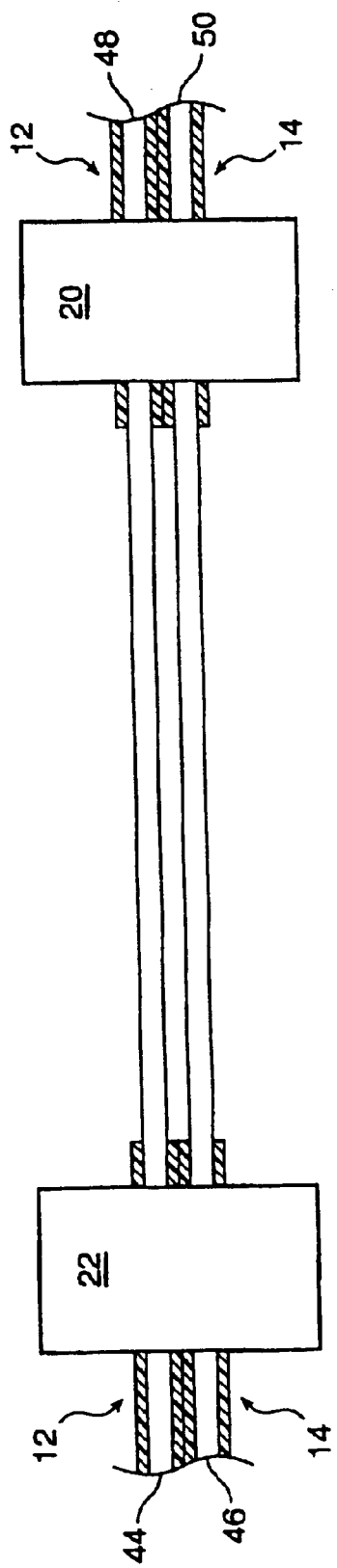
FIG. 4 is a schematic diagram of a pair of stripped fibers held side-by-side.

A method of forming a microbend fused coupler 10 is as follows. Referring now generally to FIG. 3 and specifically to FIG. 4, first, a plurality of fiber optic fibers, preferably two, 12 and 14, are provided. Plastic coatings are stripped from fibers 12 and 14 in the region to be joined side by side with each other. As described above, the core 18 of the fibers is preferably 4–12 μm in diameter and the diameter of the fibers with cladding is preferably 125 μm, for example, Cornning SMF-28.

Figure 6:
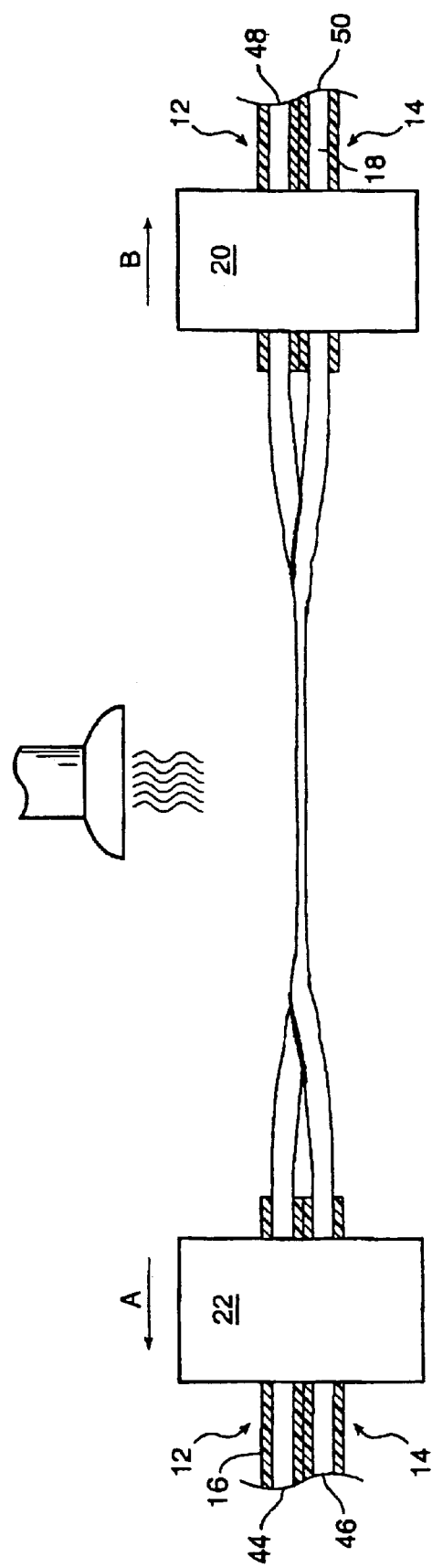
FIG. 6 is a schematic diagram of the fusing step of the present invention.

Thereafter, the fibers 12 and 14 are oriented in side by side fashion. This is preferably accomplished by receiving fibers 12 and 14 in rotatable fiber holders 20 and 22 and pulling the fibers 12 and 14 taught one to the other under equal tension and then twisting the fibers about one another sufficiently to cause the fibers to come into contact (usually one twist is sufficient). The midsection of the twisted fibers is then exposed to heat source 24 as shown in FIG. 6. Then, while heating, fibers 12 and 14 are pulled and stretched axially by moving holder 20 along arrow B and moving holder 22 along arrow A simultaneously until fibers 12 and 14 commence fusing in the middle area as desired (as shown in FIG. 6). Of course, just one holder may be moved while the other remains stationary as well. The drawing of the fibers is accomplished at a programmable speed (preferably 10 μm/second to 500 μm/second) until a light presented by a light source (not shown) through, for example, fiber 12 is detected in a preferred manner by a light detector (not shown) and desired coupling ratios are likewise detected. Light detector 28 is preferably an optical spectral analyzer, and may be utilized in combination with a multi-channel power meter device capable of monitoring for detection of preferred coupler characteristics, in which predetermined coupling ratios are sought by an operator.

Figure 5:
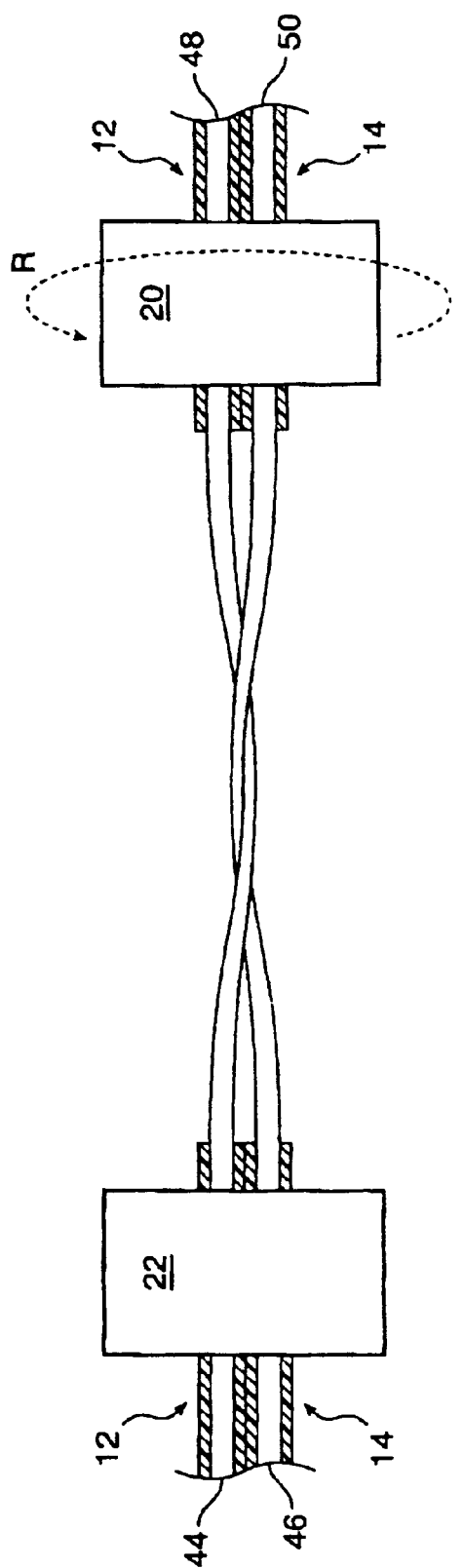
FIG. 5 is a schematic diagram of the twisting step of the present invention.

Optionally, and referring now to FIG. 5, fibers 12 and 14 may be non-elastically twisted one about the other in the coupling region by rotating holder 20 arcuately about arc R. Of course, holder 22 may also be rotated in an opposite arcuate fashion (not shown) to achieve twisting of the fibers in the coupling region 34. Twisting and pulling are continued until precise coupling ratios are attained. This may be monitored by providing a light source (not shown) at end 44 of fiber 12 and transmitting a light which may be detected by a light detector (not shown) at end 50 of fiber 14. The number of twisting cycles is preferably about 2(n)×90°, where n=1–400 and is dependent on the stretching length and twisting rate in combination with the predetermined passband spacing desired.

Figure 7:
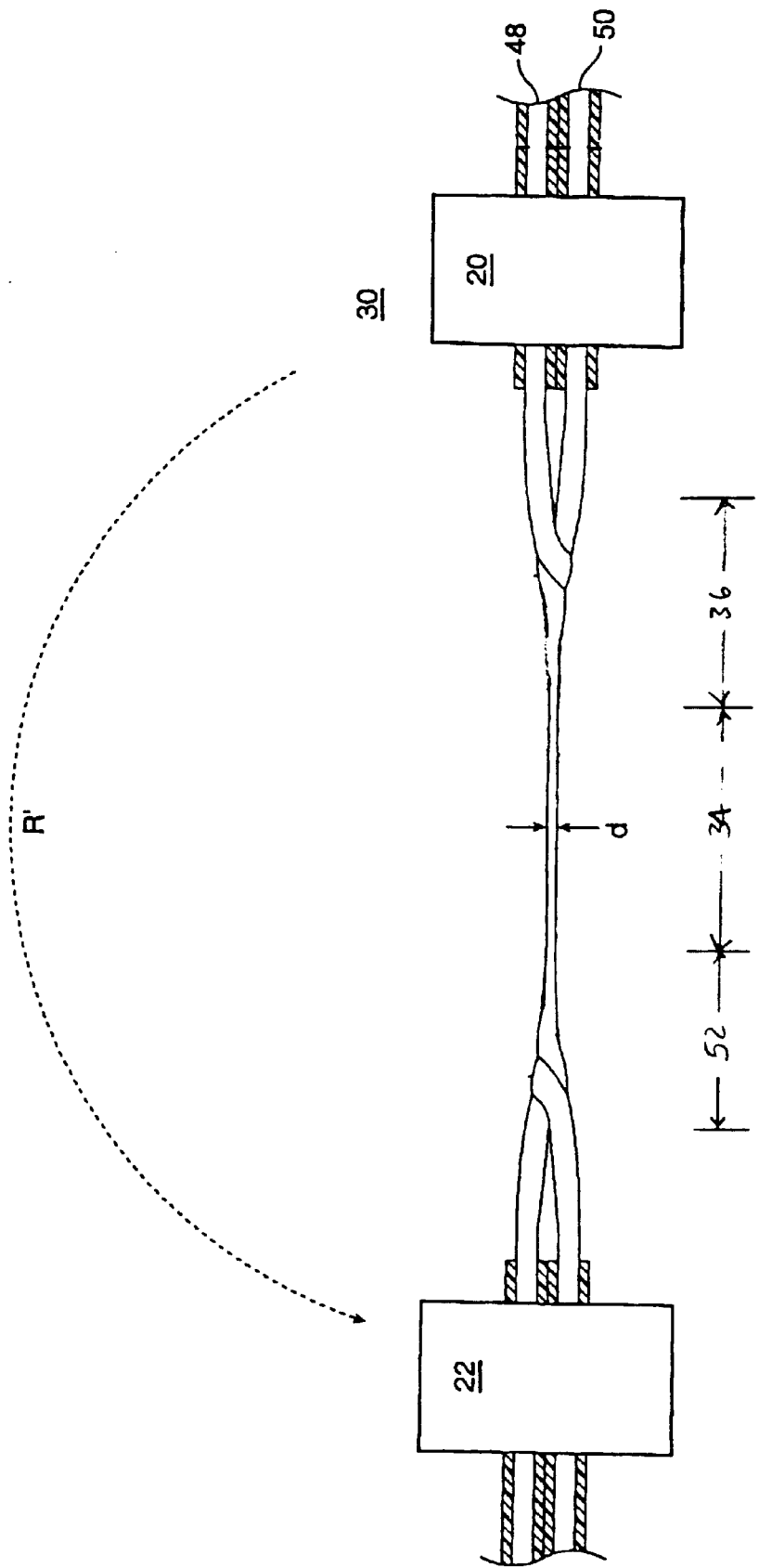
FIG. 7 is a schematic diagram of the adhering and bending step of the present invention.

Thereafter, and referring now to FIG. 7, fibers 12 and 14, having been fused together, resulting in tapered section 36 and 52 and reduced diameter coupling section 34 due to the drawing of the fibers 12 and 14. The coupling region 34 is limited by the geometry of the starting fibers 12 and 14, the resulting goal of an air-cladding state about the coupling region 34, and an effective minimized radius of curvature r (of preferably less than 30 mm and most preferably less than 5 mm).

Rotatable fiber holder 20 is then rotated about an angle of about 180° about arc R' so that a U-shaped bend may be formed in region 34. Both ends of the tapered fibers are then adhered to substrate 30 in non-coupled regions 36 and 52.

Optionally, tapered region 52 may be adhered to substrate 30 by adhesive means 40 and substrate 30 is then rotated an angle of about 180° about arc R' so that a U-shaped bend 38 may be formed in region 34 about reduced diameter coupling region 34. Ends 48 and 50 are then detached from holder 20. Thereafter, tapered region 36 is likewise adhered to substrate 30.

Ends 44 and 46 are then detached from holder 22 resulting in the embodiment depicted in FIG. 2. As will now be appreciated, the bend may be any bend desired, but will usually be a minimized bend due to space constraints. As will also now be appreciated, the bend may affect the passband spacing and additional adjustment of the bend may be desirable to adjust for such shifting. This may be accomplished, for instance, by trimming the rotation angle by twisting the fibers additionally about one another or exposing the coupling area to a UV radiation source. Furthermore, annealing the bend at high temperature will be understood to enhance performance stability. However, if annealed, further trimming may be required by heating the coupling area or exposing same to a UV radiation source and bending the conic portion of the Y-shaped fiber to again achieve the desired passband spacing. Thereafter, the unit is encapsulated as depicted in FIG. 1.

While embodiments and applications of this invention have been shown and described, it would be apparent to those skilled in the art that many more modifications than mentioned above are possible without departing from the inventive concepts herein.

What is claimed is:

1. A fiber optic coupler, comprising, in combination:
   a first fiber;
   a second fiber;
   a bend region between a first tapered transition region that terminates in a first Y-shaped region and a second tapered transition region that terminates in a second Y-shaped region, the bend region having been formed by:
      twisting the first fiber with the second fiber; and
      heating and pulling the first and second fiber such that the first and second fibers fuse in the bend region; and
   a rigid substrate encapsulated within a sealed confine, wherein the first tapered transition region and the second tapered transition region are bonded to the rigid substrate such that the bend region is substantially U shaped and that the first and second Y shaped regions are substantially side by side.

2. The fiber optic coupler of claim 1 further comprising an air-cladded state about said bend region.

3. The fiber optic coupler of claim 2 further comprising a substantially low-loss condition in said air-cladded state of said bend region.

4. The fiber optic coupler of claim 1 further comprising a radius of curvature of said bend region of less than 40 millimeters.

5. The fiber optic coupler of claim 1 wherein said radius of curvature of said bend region lies in a range of about 5 micrometers to about 30 millimeters.

6. The fiber optic coupler of claim 1 further comprising a substrate and wherein said bend region is coupled to said substrate.

7. The fiber optic coupler of claim 6 further comprising a confine, that encapsulates said bend region.

8. The fiber optic coupler of claim 1 wherein said bend region forms an arc of greater than zero degrees.

9. The fiber optic coupler of claim 1 wherein said bend region forms an arc of greater than 90 degrees.

10. The fiber optic coupler of claim 8 wherein said bend region forms an arc of greater than zero degrees.

11. The fiber optic coupler of claim 9 wherein said U-shaped bend region includes a radius of curvature of about 5 mm to about 30 mm.

12. The fiber optic coupler of claim 9 further comprising an air-cladding state about said bend region.

13. The fiber optic coupler of claim 9 wherein said U-shaped bend region includes a radius of curvature of less than about 40 mm.

14. The fiber optic coupler of claim 1 wherein said bend region forms an arc of greater than 90 degrees.

15. The fiber optic coupler of claim 1 wherein said bend region forms an arc of about 180 degrees.

16. A method for manufacturing a fiber optic coupler, the method comprising:

twisting a first fiber with a second fiber;

fusing the first fiber with the second fiber in a bend region by heating and pulling the first and second fiber such that the bend region having a first tapered transition region that terminates in a first Y shaped region and a second tapered transition region that terminates in a second Y shaped region;

bonding the first tapered transition region to a rigid substrate;

rotating the second tapered transition region such that the bend region is substantially U shaped; and bonding the second tapered transition region to the rigid substrate such that the first and second Y shaped regions are substantially side by side.

17. A method as defined in claim 16, further comprising annealing the bend region.

18. A method as defined in claim 16, further comprising trimming a passband spacing and wavelength.

19. A method as defined in claim 18, wherein trimming a passband spacing and wavelength further comprises one of more of:

exposing the bend region to a radiation source; and additional twisting of the first and second fibers.

20. A method as defined in claim 16, further comprising encapsulating the rigid substrate and the first and second fibers within a confinement.

\* \* \* \* \*

UNITED STATES PATENT AND TRADEMARK OFFICE
CERTIFICATE OF CORRECTION

PATENT NO. : 6,731,842 B2
DATED : May 4, 2004
INVENTOR(S) : Peter Z. Chen

It is certified that error appears in the above-identified patent and that said Letters Patent is hereby corrected as shown below:

Column 1,
Line 16, after "has come" insert -- to --.

Column 6,
Line 53, after "confine" remove ",".

Column 8,
Line 9, after "comprises one" change "of" to -- or --.

Signed and Sealed this

Twenty-first Day of February, 2006

JON W. DUDAS
*Director of the United States Patent and Trademark Office*